Sept. 1, 1964      H. BRUCKER      3,146,644

DEVICE FOR CONTROLLING THICKNESS IN ROLLING MACHINES

Filed Feb. 3, 1960      5 Sheets-Sheet 1

Fig.1

Hans Brucker
Inventor:
by Mason, Porter, Miller & Stewart
Attorneys

Sept. 1, 1964   H. BRUCKER   3,146,644
DEVICE FOR CONTROLLING THICKNESS IN ROLLING MACHINES
Filed Feb. 3, 1960   5 Sheets-Sheet 5

Fig. 8

United States Patent Office 3,146,644
Patented Sept. 1, 1964

3,146,644
DEVICE FOR CONTROLLING THICKNESS IN ROLLING MACHINES
Hans Brucker, Edgoven 4A, Hennef (Sieg), Germany
Filed Feb. 3, 1960, Ser. No. 6,406
Claims priority, application Germany Feb. 5, 1959
3 Claims. (Cl. 80—56)

This invention relates to a thickness regulating device for rolling machines, and especially a device of a kind which contains a thickness measuring device at a finite distance behind the roll gap.

The invention relates to a thickness measuring device for rolling machines which comprises a thickness measuring device disposed at a finite distance from the roll gap and, in order to eliminate the effects of the dead time of the regulating circuit, a storage tape which is moved in synchronism with the rolled material and which is provided for the continuous storage of changes in the thickness of the rolled material and which is recorded by a second thickness measuring device situated in front of the roll gap, the said tape being intended especially for the magnetic recording and storage of signals. With this arrangement, moreover, a pick-up device is provided for the stored signals beyond the recording device at a distance corresponding to the dead time, and in addition to the thickness measuring device disposed beyond the roll gap it effects an adjustment of the rolling machine in accordance with varying rolled material thickness.

The apparatus according to the invention comprises a storage tape with a first track for recording the thickness fluctuations of the strip passing into the roll gap from a predetermined desired value, and with a second track on which, before the rolling operation, a frequency subsequently acting as carrier is recorded with constant amplitude. The apparatus according to the invention further comprises a first pick-up device, which constantly senses the second track and converts it into an electrical alternating-current voltage; a modulation device, controlled by the thickness measuring device in front of the roll gap according to the deviations of the thickness from the pre-determined required value, the said modulating device being intended for the said alternating-current voltage; a recording device which records this modulated alternating-current voltage on the first-mentioned track; a second pickup device at a distance from the recording device corresponding to the distance of the thickness measuring device from the roll gap; and an adjusting device which is connected to the said pick-up device and which adjusts the rolling machine according to the amplitude of the picked-up alternating-current voltage.

According to the invention, therefore, the oscillator for producing the alternating-current voltage of constant frequency as provided in a known regulating device is dispensed with and is replaced by a prior recording of an alternating-current voltage on a separate track and the sensing of this track by a separate sound head. The effect of this step is to prevent frequency differences which would result in the aforesaid errors from occurring between the individual sound heads on the sound tape.

The storage tape, for example, magnetic tape, is synchronised in manner known per se to the feed of the rolled material. According to the invention it is proposed that the feed of the storage tape should be proportional to the advance of the rolled material. Equivalently, in some cases, it is also possible to provide proportionality in relation to the rotary angle of the take-up reel. Since the radius of the unwinding coil continually decreases in the course of emptying to practically one third, the angular velocity of the feed reel increases continuously if the speed of feed of the rolled material is kept constant, and in fact increases to about three times the initial value. Correspondingly, in the coupling proposed according to the invention, the speed of the storage tape is also increased. This increase, however, has no influence on the recording and reproduction or on the complete regulation, since the delay times occurring in the rolling machine are in each case exactly reproduced on the storage tape. The coupling proposed according to the invention, on the other hand, results in a considerable simplification and hence reduction in cost of the apparatus.

According to the invention, provision is further made that the speed of the storage tape should be coupled to the feed of the rolled material by way of an electrical shaft.

As stated above, according to the invention the roll gap or the longitudinal tension on the rolled material is adjusted proportionally to the amplitude of the alternating-current voltage picked up from the storage tape. In these circumstances, it is in the first instance a matter of experience how large the proportionality factor is made. If the rolling machine is used in all cases for approximately the same rolling jobs, the proportionality factor can be fixed once and for all. Moreover, according to the invention, provision can be made for the proportionality factor between the amplitude of the picked-up alternating-current voltage and the adjustment value for the rolling machine to be adjustable.

Adjustment of the proportionality factor may be effected by hand in the simplest case. In fact, if variations in thickness occur in the incoming strip, it is immediately recognised whether they have been regulated out in the required manner by the arrangement according to the invention using the storage tape. If these thickness variations recur beyond the rolling gap, and this will be seen by observation of the thickness measuring device disposed beyond the rolling gap, the proportionality factor must be increased accordingly. Similarly, an over-regulation may have occurred inasmuch as an excessive proportionality factor has been used. In that case, a sudden increase in the thickness of the incoming strip would even give a corresponding reduction of the thickness of the outgoing strip.

Although the adjustment of the proportionality factor by hand in the above described manner does not cause any special difficulties, for further improvement of the arrangement according to the invention an automatic adjustment of the said proportionality factor is provided. To this end, according to the invention, a third pick-up device disposed at a distance from the second pick-up device corresponding to the distance of the second thickness measuring device from the roll gap, and a control device which is controlled by said third pick-up device and by the second thickness measuring device, is proposed, which control device corrects the said proportionality factor in the direction of decreasing thickness deviations.

According to the invention, in these circumstances, provision is made for the said control device to vary the proportionality factor according to the opposite polarity of the deviations in the thickness of the rolled material as measured by the two thickness measuring devices before and after the said material emerges from the roll gap.

In these conditions it is naturally necessary to take into account not only the opposite polarity of the thickness deviations, but also their association in time, and this is effected automatically by the device according to the invention. In order to prevent thickness deviations in the rolled material after the roll-gap due exclusively to changes in the roll stand resulting from an adjustment of the proportionality factor, such variations in thickness are employed to vary the proportionality factor only if a corresponding variation in thickness before the material enters the roll gap corresponds to them. In practice, for this purpose, use may be made of a per se known Ferraris motor or a phase-sensitive rectifier circuit. The adjustment value of such a motor or the voltage taken from the rectifier bridge can then be used to vary the proportionality factor.

Hereinbefore it was in the first instance assumed that the adjustment of the rolling machine, that is to say either the adjustment of the roll gap or the change of the longitudinal tension on the rolled material, occurred without inertia. In practice, however, the adjustment, for example, of the roll gap will require a certain finite time since the forces occurring there render necessary for transmission purposes, adjustment spindles which are turned at definite speed. In order, consequently, to have adjusted the roll gap to the correct value at the time at which the thickness variation measured by the thickness measuring device enters the roll gap, it is necessary to make the delay time between the recording and picking-up of the storage tape somewhat less than the transit time of the rolled material from the thickness measuring device to the roll gap. To this end, according to the invention, provision is made for the first pick-up device which picks up the modulating alternating-current voltage from the storage tape to be moved in opposition to the direction of motion of the storage tape according to the respective speed of the rolled material and the speed of adjustment of the rolling machine.

The adjustment of the rolling machine, for example the roll gap or the longitudinal tension exerted on the rolled material, can be controlled in any desired manner by the picked-up modulating alternating-current voltage. Preferably, however, to this end, a follower device is proposed, the required value or guide value of which is composed additively of the thickness deviation measured by the second thickness measuring device and an additional value which is the product of the deviation in thickness of the strip measured by the first thickness measuring device in front of the roll gap and the said proportionality factor. By this control of the adjustment of the roll gap or of the longitudinal tension according to the invention, the control effects initiated by the two thickness measuring devices are combined in an advantageous manner.

In the event of slow changes in the thickness of the incoming material, the above-described arrangement according to the invention is immediately able to effect a preadjustment of the roll gap or of the longitudinal tension such that the thickness of the strip emerging from the roll gap remains constant and the dead time of the regulating device containing the thickness measuring device beyond the roll gap affords no difficulty.

However, as soon as the variation in the thickness of the incoming strip takes place more rapidly per unit of time, especially when there are only momentary thick or thin regions in the incoming strip, the above-described arrangement according to the invention is no longer able to clear these variations owing to the inertia of the complete rolling machine. To enable such rapid variations in thickness in the incoming rolled material to be regulated, according to the invention, an additional pick-up device is proposed for the alternating-current voltage modulated according to the thickness deviations of the incoming material; a device which is connected to said additional pick-up device and which forms the differential variation per unit of time of the amplitude of this alternating-current voltage; and an adjusting device controlled by said latter device for the corresponding automatic reduction of the speed of the material being rolled. Devices for forming the ratio of a measured value per unit of time are known and are of extremely simple construction, especially in the form of electronic circuits. Such a differentiating device is, therefore, connected according to the invention to the additional pick-up device and controls an adjusting device for the drive of the rolling machine and hence also for the speed of the storage tape. The effect achieved by the above-described additional arrangement is that in the event of sudden and very steep variations in thickness the rolling speed is immediately reduced accordingly, so that at the lower rolling speed which comes into being a regulation of the deviation in thickness is immediately possible. In order that there may be sufficient time adequately to reduce the rolling speed by the time the corresponding point of the material reaches the roll gap, according to the invention it is further proposed that as the speed of rolling increases an automatic adjustment device should advance the additional pick-up device against the direction of movement of the storage tape to an extent such that the rolling speed is reduced to the proposed lower value at the latest when the measured steeper deviation of the thickness per unit of time enters the roll gap. In these circumstances, the speed of the material being rolled may, for example, be measured in manner known per se by a tachometer or the like coupled to the rolls and the displacement of the aforesaid additional pick-up device may be effected to correspond to the voltage produced by said tachometer or the like, this being effected automatically, or, in some cases, manually only. In these conditions, if required, the acceleration can also be take into account. In every case, the arrangement according to the invention provided with the additional device proposed above will ensure that a strip entering the rolling machine with considerable variations in thickness is automatically rolled at a low rolling speed, while another strip or the like which does not have such variations in thickness is treated at a correspondingly higher rolling speed. In both cases, the arrangement according to the invention ensures that the specified tolerances are maintained. Depending on the tolerances specified in each individual case, a threshold value can be provided for the aforesaid differential quotient, the retardation of the rolling speed occurring only above this threshold value. Said threshold value may be adjusted by hand, so that the rolling machine runs at the then permissible maximum speed according to the specified tolerances. The arrangement according to the invention therefore ensures that the rolling machine is always adapted to its task and is utilised in the optimum manner.

The above-described arrangement, according to the invention, is suitable not only for the direct regulation of the thickness of the material emerging from a rolling machine, but can be used in all cases in which a quite definite larger width of the emerging strip is to be obtained by rolling the material to a smaller thickness. In this case, no change is made and the rolling machine itself, while instead of the above-described two thickness measuring devices correspondingly constructed with measuring devices are used.

The invention is explained in detail hereinafter with reference to exemplified embodiments and the drawing. In the latter.

Figure 1:
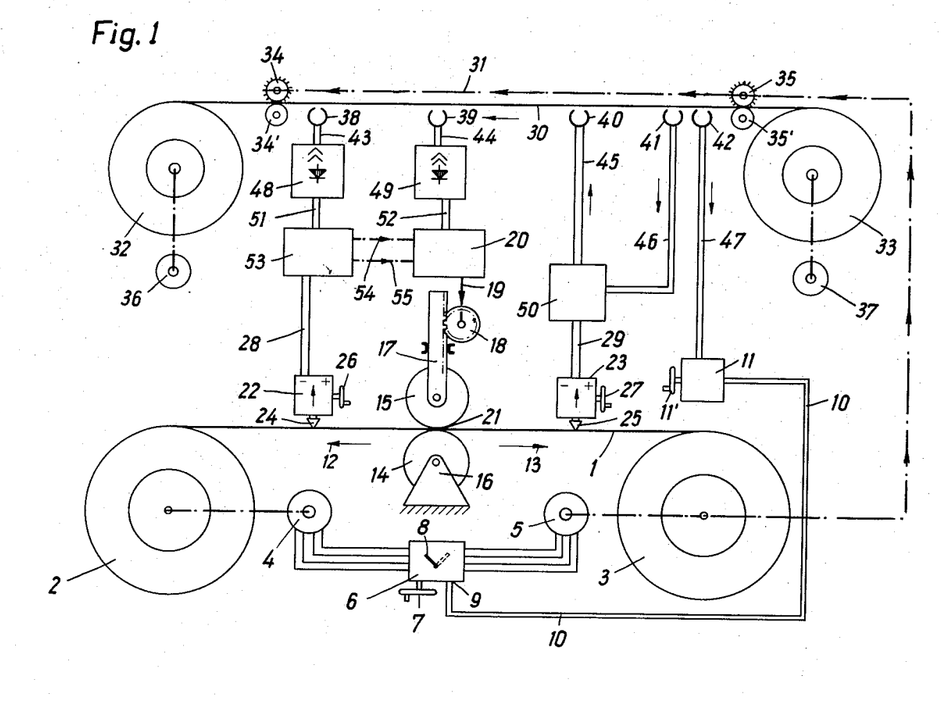
FIG. 1 is a diagramatic general view of the arrangement according to the invention.

As will be apparent in the first instance from FIG. 1, the material to be rolled, for example a strip 1 on reel 3 is taken between the two working rolls 14 and 15 of a roll stand in the direction of the arrow 12 to a take-up reel 2. This strip may be moved either in the direction of the arrow 12 or in the opposite direction indicated by the arrow 13; to this end, the two reels 2 and 3 are driven by D.C. shunt-wound motors 4 and 5, which are supplied with current from a per se known control device 6 and are adjusted to the correct speed of revolution or correct torque. When reel 2 is to serve as pick-up reel, the motor 4 acts as driving motor, while the other motor 5 either runs in no-load conditions or else, if it is desired to exert a certain longitudinal tension on the strip 1, is connected as a generator and acts as a brake. Change-over of the direction of rotation is effected at the control device 6 by throwing the switch 8, while the speed of feed of the material 1 or the speed of revolution of the take-up reel can be adjusted at the adjusting wheel 7 of the control device. The speed of revolution can further be controlled not only by means of the adjustment wheel 7, but also automatically by a control line 10, which is connected at 9 to the control device, and through which a control voltage is supplied in manner known per se. The effect of this automatic control through control line 10 will be discussed in detail hereinafter. The speed of the rolls is also controlled in corresponding manner. Generally, the roll speed will even be controlled primarily and the reel speeds be made to follow accordingly. These details are omitted from the drawing for the sake of simplicity.

The roll stand is indicated only diagrammatically by the two working rolls 14 and 15, of which the lower one 14 is mounted in a fixed bearing 16, while the other 15 is adjustable as to height, so that the roll gap 21 situated between the working rolls can be adjusted in its width as required. The adjustment of the upper roller 15 as to height is indicated in a simplified form diagrammatically in FIG. 1 by a rack 17, which supports the roll 15 at its lower end and with which a pinion 18 meshes, this pinion being capable of adjustment through the shaft 19.

In front of the roll gap 21, with reference to the direction of feed 12, and a certain distance from said gap, there is provided a thickness measuring device 23 with a measuring feeler 25 which senses the strip 1 and an adjustment wheel 27 for the value required for the thickness at any time.

To correspond, a second thickness measuring device 22 with a measuring feeler 24 and an adjustment wheel 26 for the required strip thickness is provided beyond the roll gap, again when viewed in the direction of the arrow 12. The construction and mode of operation of these two thickness measuring devices will be discussed in detail hereinafter.

In the upper part of FIGURE 1, the storage tape 30 associated with the rolling machine and with the associated auxiliarly devices is illustrated. The storage tape is wound on the right-hand side on a reel or spool 33, runs from the latter through a pair of rollers 35, 35' over the so-called working section to a second pair of rollers 34, 34' and after this second pair of rollers to a second reel or spool 32. The storage tape, which in the exemplified embodiment illustrated comprises magnetic tape, is provided with a perforation 107 (FIGURE 6) at one or both longitudinal edges in manner known per se and is transported by engagement with the rollers 35 and 34 provided with corresponding teeth. As will be seen from FIGURE 1, the feed of the tape is synchronised with the feed of the material 1 being rolled, the two driving rollers 35 and 34 being rigidly coupled to the shaft of the reel 3, preferably by way of an electrical shaft which, in the drawing, is indicated only diagrammatically in the form of a chain-dotted line 31. Instead of being coupled to the reel 3, the storage tape in some cases can be coupled to the reel 2. FIGURE 1 also shows special electric motors 36 and 37 for driving the reels or spools 32 and 33, but these electric motors are of such minor power or are connected to their reels by way of a slipping clutch (not shown) that the feed of the storage tape 30 is controlled by the rollers 34 and 35 respectively. A corresponding arrangement is naturally also provided which, on the change-over of the direction of rotation of the material 1 being rolled, also changes over the two aforesaid motors 36 and 37. In each case provision is made for the storage tape 30 to run synchronously with the material 1 being rolled and in the same direction as the latter.

A plurality of sound heads are distributed over the working section of the storage tape 30 situated between the pairs of rollers 35, 35' and 34, 34' and are disposed at predetermined points and serve for recording or picking-up signals, in this case alternating-current voltages. In the simplest embodiment of the invention, use is made of a magnetic storage tape with two sound tracks 93 and 94 (see FIGURE 6), situated side by side in parallel relationship. In these conditions, one track 93 on which an alternating-current voltage prior to the operation of the rolling mill has been recorded at constant frequency and at constant tape feed speed and with constant amplitude. This track replaces a separate oscillator and, as will be seen from FIGS. 1 and 6, is sensed by a sound head 41.

The other track 94 serves for the recording and picking-up of the thickness deviations in the material strip 1 for rolling in comparison with a predetermined, fixed, required value at each point of its length. The strip, which may either have been supplied by another manufacturer or else have been rolled by one or more preceding passes on the roll stand shown in FIG. 1, may in the first instance be assumed to run from the reel 2, through the roll gap 21 and on to the reel 3. In this preparatory process its thickness is picked-up between the roll gap 21 and the take-up reel 3 by means of the measuring feeler 25, and is compared automatically in the thickness measuring device 23 with the required value to which 27 has been adjusted. The required value to which 27 is adjusted is advantageously the mean thickness of the strip running on to the reel 3. Depending upon the state of the strip, therefore, there are positive or negative deviations of the thickness from the required value. As will be explained hereinafter with reference to FIG. 2, the thickness measuring device 23 continually forms a direct-current voltage, which is proportional to the thickness deviation at any time and which also corresponds to it in respect of polarity and which is fed by a control line 29 to an amplifier modulator 50. This amplifier modulator 50 is constructed in manner known per se and comprises an amplifier for low-frequency alternating-current voltages, the amplification of which is increased or reduced according to the control voltage supplied through the control line 29 and corresponding to the thickness deviation at any time. To the input side of the amplifier modulator 50 by way of the line 46 is supplied the alternating-current voltage taken off the track 93 by the sound head 41 and, after appropriate modulation by the thickness measuring device 23, it is fed through the line 45 to the sound head 40. In these circumstances, in order to permit a distinction between the positive and the negative thickness deviations, it is possible to give the degree of modulation for a thickness deviation of zero a mean value, for example 50%, and allow the positive thickness variations to increase the modulation accordingly and the negative thickness deviations reduce the modulation accordingly, or vice versa. By means of the sound head 40, the alternating-current voltage modulated according to the thickness deviations is recorded on the sound track 94 of the storage tape 30 (see FIG. 6).

Figure 6:
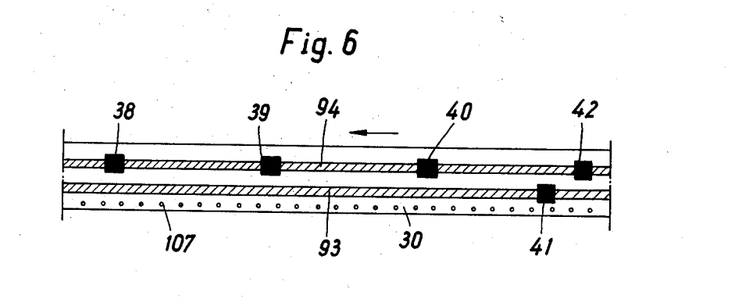
FIG. 6 is a plan view of part of the storage tape with the associated sound heads.

Two further sound heads 39 and 38 are disposed on the working section of the storage tape, as will be seen from FIGS. 1 and 6. In these circumstances, provision is made for the position of the three sound heads 38, 39 and 40 to correspond respectively exactly to the position of the thickness measuring device 22, the roll gap 21 and the thickness measuring device 23 on the working section of the rolling mill. In consequence, the distance between the sound heads 38 and 39 also corresponds exactly to the distance between the thickness measuring device 22 and the roll gap 21, while on the other hand the distance between the sound heads 39 and 40 corresponds exactly to the distance between the roll gap 21 and the thickness measuring device 23. The expression "correspondingly" or "accordingly" used hereinbefore must in these circumstances be interpreted in the sense of a strict mathematical ratio, the conversion factor arising out of the reel speed of the rolling machine in relation to the feed speed of the storage tape. In the special case where the speed of the storage tape is equal to the speed of the material being rolled, exact equality is obtained from the aforesaid ratio. This case is shown in FIG. 1 for example, in which, therefore, the distances between the three sound heads 38, 39 and 40 are exactly equal to the distances between the thickness measuring devices and the roll gap in the rolling machine.

By the strict synchronisation of the storage tape 30 with the material 1 being rolled and the aforesaid arrangement of the three sound heads 38, 39 and 40, the effect achieved is that a corresponding fault, for example a sudden thickening, in the material 1 being rolled, on the passage of the strip in one or other direction, passes the thickness measuring device or the roll gap or the other thickness measuring device in each case at exactly the same moment as the discontinuity corresponding to this thickness deviation on the storage tape passes the corresponding sound head or heads.

As already stated above, the material 1 undergoing rolling first runs in the direction of the arrow 13 and is taken up by the reel 3. In these circumstances, the thickness deviations of the material being rolled are recorded on the storage tape 30 by the sound head 40 in the form of a modulated alternating-current voltage, the said storage tape 30 then being wound on the reel or spool 33. Now as soon as the whole of the material 1 being rolled has passed through and been wound on the reel 3, the actual rolling process can begin. For this purpose, the switch 8 at the control device 6 is thrown over to change the direction of motion of the material being rolled, so that the same now runs off the reel 3 in the direction of the arrow 12, passes the thickness measuring device 23 and reaches the roll gap 21, and is rolled accordingly there, then passes the other thickness measuring device 22 and is finally wound on the reel 2. Now as long as no thickness variations occur, during this rolling process, in the material entering the roll gap 21 from the right, the thickness of the rolled strip emerging from the roll gap towards the left is determined solely by the regulating circuit comprising the thickness measuring device 22, the correction device 53, the follower device 20 and the adjusting device 18, 17. The thickness measuring device 22 is constructed in the same way as the thickness measuring device 23 already mentioned and will be explained in detail hereinafter. The required value for the thickness of the material being rolled is adjusted at the thickness measuring device 22 in each case by means of the adjusting wheel 26. Now as soon as the measuring feeler 24 detects a larger or smaller actual thickness in the rolled strip emerging from the roll gap 21, a control order is passed through the line 28 in the form of a direct-current voltage to the aforesaid regulating device, which comprises the parts 53 and 20, and the roll gap is adjusted accordingly. After the correct roll gap width has been adjusted in this manner, the regulating device comes to rest and the strip runs—in the imaginary case assumed—out of the roll gap with the required thickness and is reeled on the spool 2.

Now as soon as the strip 1 unwinding from the reel 3 and entering the roll gap 21 from the right has a variation in thickness, the aforesaid simple regulating device would no longer be sufficient to regulate this variation in good time. In fact, when the thickened strip region enters the roll gap 21, the regulating device in the first instance does not detect this, so that the roll gap remains unchanged. In consequence, the strip does not emerge from the roll gap with the required thickness, but with a somewhat larger thickness corresponding to the thickened region on the inlet side. This increase in the actual thickness is detected by the thickness measuring device 22 only after expiration of the dead time which depends on the distance of the thickness measuring device 22 from the roll gap on the one hand and on the speed of the feed of the material being rolled on the other hand. The regulating device containing the thickness measuring device 22 would naturally again bring about the required thickness after some time; until then, however, a certain amount of time would elapse and the strip which had passed through in the meantime would continue to have a thickened region which would no longer be rolled away even during the subsequent rolling operations.

It is here that the action of the apparatus according to the invention employing the storage tape 30 begins. Since, in fact, during the preceding winding of the strip in the direction of the arrow 13 on the reel 3, each fault, that is to say each variation of the thickness of the strip, was recorded at exactly the same moment at which it passed the thickness measuring device 23 by means of the sound head 40 in the form of a magnetisation on the corresponding point of the storage tape 30, when the material unwinds in the direction of the arrow 12 and the strip is rolled each individual fault, that is to say variation in thickness, enters the roll gap 21 at exactly the same moment as the corresponding recording on the storage tape passes the sound head 39. The alternating-current voltage picked up by the sound head 39 is fed through the line 44 to the amplifier 49 which first amplifies and then rectifies the alternating-current voltage. The direct-current voltage thus resulting is fed through the line 52 to the follower device 20 which adjusts the roll gap 21 by way of the shaft 19 and the mechanical transmission 18, 17, the said adjustment corresponding to the magnitude of the direct-current voltage and being directed according to the polarity of the said direct-current voltage. If, for the sake of simplicity, it is first assumed that the adjustment of the roll gap occupies a negligible amount of time, then the roll gap is adjusted by a corresponding value exactly at the same moment as the strip running into it varies in thickness. Since in actual fact the adjustment of the roll gap takes a definite time, according to the invention provision is made to displace the sound head 39 somewhat in the direction of the sound head 40 so that the adjustment order is received earlier by this sound head and the roll gap is adjusted to the new value in good time when the fault enters it.

The roll gap adjustment required to leave unaltered the thickness of the strip emerging from the roll gap in the event of a variation in the thickness of the strip entering the roll gap is not equal to the variation in the thickness of the incoming strip itself, but depends on it in a relatively complicated manner. In the apparatus according to the invention, therefore, provision is made for the proportionality factor to be adjustable between the roll gap adjustment initiated by the sound head 39 and the causal variation in thickness of the incoming strip, this adjustment being possible at varying degrees at the follower device 20. Per se, an adjustment of this proportionality factor by hand would already be sufficient for many purposes. According to the invention, however, a special correction device 53 is provided for the adjustment of the said proportionality factor, and its mode of operation will be described in detail hereinafter.

Figure 2:
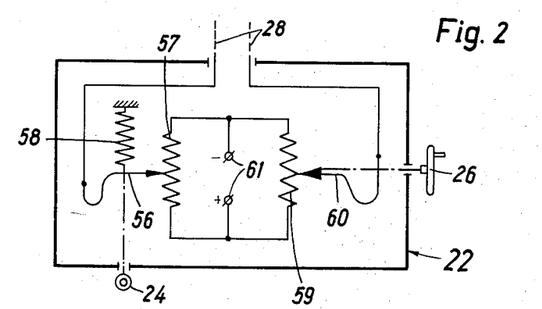
FIG. 2 is a simplified circuit diagram of the thickness measuring device beyond the roll gap.

Before discussing the action of the follower device and the correction device, the construction and mode of operation of the thickness measuring device 22 will be explained with reference to FIG. 2. This construction, moreover, fully corresponds to the construction of the thickness measuring device 23, so that no explanation of the latter need be given. In the diagrammatic illustration of the thickness measuring device in FIG. 2 reference 24 denotes the measuring feeler, which is advantageously constructed as a roller and which bears on the surface of the material 1 and continually senses the thickness of the strip against a corresponding co-operating bearing (not shown). The roller 24 is thus displaced in the vertical direction against the action of a compression spring 58 and during this displacement drives the sliding contact 56 of a potentiometer 57. The latter is connected in a bridge circuit with a similar potentiometer 59, the sliding contact 60 of which can be moved arbitrarily by hand by means of the adjustment wheel 26. The bridge circuit 57, 59 is fed by a constant direct-current voltage which is connected to the terminals 61. After the strip thickness has been set to the required value at the potentiometer 59 by means of the adjusting wheel 26, a direct-current voltage occurs at the output line 28 connected to the two sliding contacts 56 and 60, and the polarity and value of said direct-current voltage depend on the actual thickness of the strip as picked up by the roller 24 at any given time.

Figure 3:
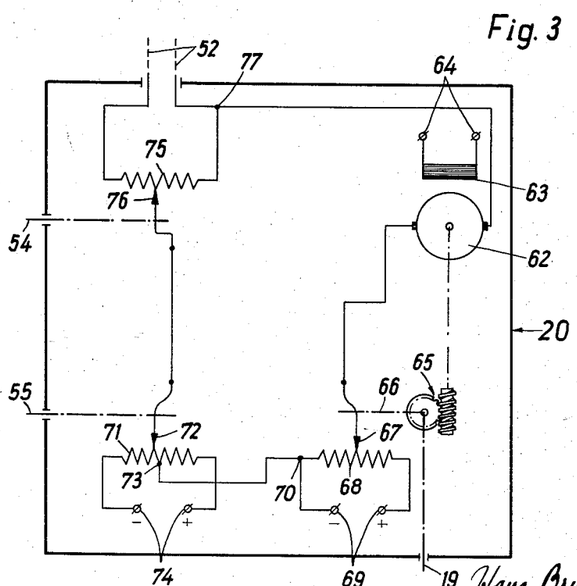
FIG. 3 is a simplified circuit diagram of the follower device for adjusting the roll gap.

The follower device already mentioned may, for example, be constructed as shown in FIG. 3 which shows a simplified circuit of such an arrangement. The control shaft 19, which is connected to the adjusting device 18, 17 for the roll gap, is driven inside the adjusting device by way of a worm drive 65 or the like from a direct-current motor 62, the field coil 63 of which is excited by a constant direct-current voltage connected to the terminals 64. The armature of the motor 62 is connected in series with a number of voltage sources, which are formed by the potentiometers 75, 71 and 68 or the direct-current voltages applied to these. Depending on the magnitude and polarity of the three direct-current voltages taken off these potentiometers, a predetermined positive or negative direct-current voltage forms at the armature of the motor 62 and turns it in one or other direction at a corresponding speed. To the potentiometer 75, by way of the line 52, there is supplied the output direct-current voltage of the already mentioned amplifier-rectifier 49, which voltage in turn corresponds to the amplitude of the alternating-current voltage picked up from the storage tape by the sound head 39. This direct-current voltage supplied to the follower device 20 by the line 52 is not used to the full extent, but only to a certain fractional amount, which is taken off between the point 77 and the sliding contact 76. The latter is displaced by the shaft 54 automatically from the correcting device 53, the mode of operation of which will be explained hereinafter. The voltage division at the potentiometer 75 constitutes the already mentioned automatic adjustment of the said proportionality factor. The second voltage source is formed by the potentiometer 68, which is applied to a constant direct-current voltage connected to the terminals 69 and from which a determined partial voltage is taken off between the sliding contact 67 and the point 70. The sliding contact is displaced through the shaft 66 from the gear 65 or the shaft 19, so that each position of the shaft 19 and hence each width of the roll gap 21 has corresponding to it a predetermined position of the sliding contact 67 and hence a predetermined partial voltage between the points 67 and 70. The operation of this potentiometer and its coupling to the adjustment value adjusted by means of the shaft 19 is well known from follower devices. The motor 62 in fact continues to run until the voltage picked up by the potentiometer 68 is exactly equal to the sum of the voltages taken off the potentiometers 75 and 71. The current through the armature of the motor 62 then disappears and the shaft 19 remains stationary. The potentiometer 71, which is likewise connected through the terminals 74 to a constant direct-current voltage source, has in addition to a movable sliding contact 72 a fixed centre tapping 73, which is connected to the point 70 of the potentiometer 68. The sliding contact of this potentiometer 71 is controlled by way of a shaft 55 likewise from the correcting device 53, as will be explained hereinafter. Depending on the position of the sliding contact 72 a positive or a negative direct-current voltage is taken off the potentiometer 71, owing to the arrangement of the centre tapping 73, and is used as a second correction value.

Figure 4:
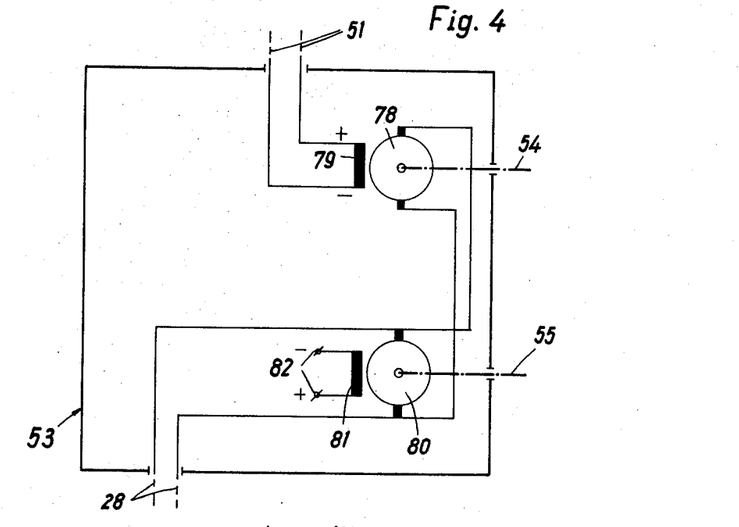
FIG. 4 is a simplified circuit diagram of the correcting device.

To be able to understand the mode of operation of the follower device 20, it is necessary at the same time to study the correcting device 53, which is shown in a simplified diagrammatic view in FIGURE 4. This correction device comprises two servo-motors 78 and 80, which drive the two control shafts 54 and 55 already mentioned above. The armature coils of the two motors are connected in parallel and are connected through the line 28 to the thickness measuring device 22. The two motors are constructed as direct-current motors with separate field windings. The field winding 81 of the servo-motor 80 is connected by the terminals 82 to a constant direct-current voltage, while the field winding 79 of the servo-motor 78 is excited by the amplifier-rectifier 48 by way of the line 51. As will immediately be apparent from a study of FIGURES 1 to 4, the servo-motor 80 thus effects the per se known regulation of the roll gap from the thickness measuring device 22 and adjusts the rolling mill on the one hand to the required value of the strip thickness as adjusted at the adjusting wheel 26, and on the other hand comes into operation even if the roll stand has varied after some time, for example through heating or other influences.

As will be immediately apparent from FIGURE 4, the other servo-motor 78 comes into operation only if both its armature and its field coil receive a current. The field coil 79 of this servo-motor 78 is excited through the line 51 from the amplifier-rectifier 48 only if the magnetic head 38 picks up a modulation from the upper tone track 94 of the storage tape 30 (see FIG. 6), that is to say if this point of the storage tape has corresponding to it a variation in thickness in the incoming strip before the corresponding time. If simultaneously with this variation in thickness of the incoming strip which would in the meantime have had to reach the thickness measuring device 22 if it has not been regulated out by the rolling machine, the thickness measuring device 22 measures a deviation, the servo-motor 78 responds and adjusts the potentiometer 75 by way of the shaft 54 (FIGURE 3). Thus if the proportionality factor to be adjusted at this potentiometer 75 did not have the correct value, the correction device, that is to say the servo-motor 78, ensures that the proportionality factor is corrected correspondingly.

Figure 5:
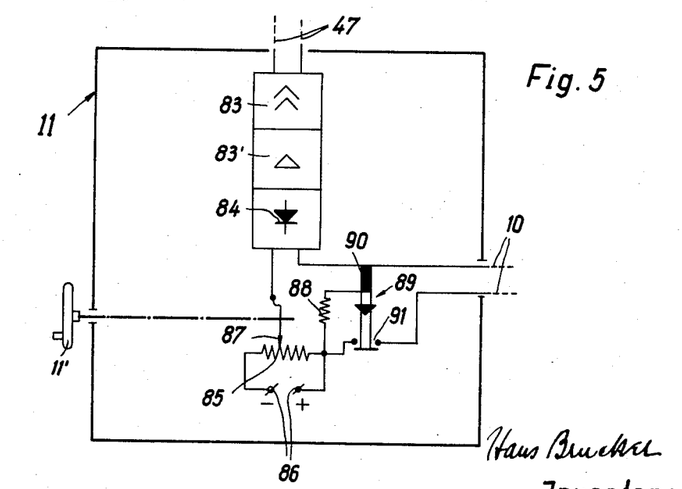
FIG. 5 is a simplified circuit diagram of the differentiating device.

As already stated, in the arrangement according to the invention a special device is provided which in the event of particular rapid or steep variations in thickness in the material undergoing rolling automatically reduces the speed of feed of the latter, or, conversely, raises the speed of the material being rolled if there are no further relatively great thickness variations. This device comprises a sound head 42 disposed at the beginning of the working section of the storage tape and a switching device 11, which is controlled by said sound head by way of the line 47 and which in turn carries by way of a line 10 a control direct-current voltage to the control device 6 for the two reel motors. The switching device 11 is shown diagrammatically in a simplified form in FIGURE 5; it comprises in the first place an alternating-current voltage amplifier 83, which is connected to the line 47 and which also contains a demodulator or rectifier, from which it is then possible to take off an output direct-current voltage which corresponds to the respective amplitude of the alternating-current voltage picked up from the storage tape 30 by the sound head 42. The device 11 further comprises a differentiating circuit or a differentiating member 83', which is connected to the output of the amplifier 83 through an equalizer, not shown, similar to 84 and which forms the first differential derivative from the direct-current voltage which is delivered by the amplifier 83 and which is proportional to the thickness deviation and which, of course, generally varies per unit of time. The differentiating circuit may, for example, comprise in known manner a transformer. The differentiating member or the differentiating circuit 83' has connected to it in the device 11 a rectifier circuit 84 which ensures that even in the event of varying polarity of the pulses delivered by the differentiating circuit 83', only a direct-current voltage pulse or a direct-current voltage of constant polarity is supplied. As will be seen from FIGURE 5, this direct-current voltage is connected in series with a variable direct-current voltage taken off a potentiometer 85. The latter is connected by the terminals 86 to a constant direct-voltage; the sliding contact 87 of the potentiometer can be adjusted from outside by means of the adjusting wheel 11'. The arrangement is made such that the direct-current voltage taken from the rectifier 84 is connected in opposition to the direct-current voltage tapped off the potentiometer 85. The output circuit further contains the winding 90 of the polarised relay 89 and, if required, a series resistance 88. The polarity association is made such that the relay 89 responds only to direct-current voltages of the polarity governed by the rectifier 84, but not to the opposite polarity of the voltage taken off the potentiometer 85. After a determined constant direct-current voltage has been adjusted at the potentiometer by means of the adjustment wheel 11', the relay 89 can be energised and its working contact 91 closed only if the direct-current voltage supplied by the rectifier 84 exceeds by a determined amount sufficient for the response of the relay the opposed voltage tapped off at the potentiometer. The relay will therefore respond only if the thickness variation has a certain slope; the response or threshold value can be pre-adjusted at the adjustment wheel 11'. As soon as the relay 89 has pulled up, there is a direct-current voltage at the control line 10 leading from the device 11, and this direct-current voltage is in each case the direct-current voltage supplied by the rectifier 84 less the voltage adjusted at the potentiometer 85. By this direct-current voltage an adjustment of the speed of the driving motor 4 or of the driving motor 5 is produced in manner known per se in the control device 6. The device 11 thus causes the speed of the material being rolled to be automatically retarded if the material entering the roll gap has thickness variations which occur more rapidly than corresponds to an adjusted threshold value. Since the braking of the motors 4 and 5 and of the associated reels 2 and 3 and, finally, of the strip 1 and of the rolls 14 and 15 of the roll stand requires a certain amount of time, the sound head 42, as will be seen from FIGURE 1, is disposed right at the beginning of the working section of the storage tape 30. There is therefore always sufficient time before the storage tape 30 passes from the sound head 42 to the sound head 39. The distance between the sound heads 42 and 39 is naturally to be dimensioned in such manner that the speed of the material undergoing rolling has already been adjusted to the corresponding new value when the fault occurs.

Figure 7:
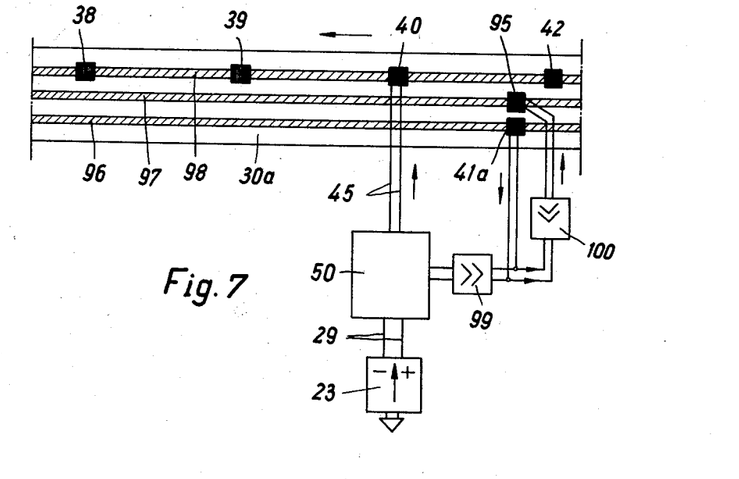
FIG. 7 is a modified embodiment of the invention with a three-track storage tape and the associated sound heads, and a circuit connected thereto.

Hereinbefore the invention has been described with reference to a two-track storage tape 30, as illustrated by way of example in FIGURE 6 with the associated sound heads. According to a further principle of the invention, however, provision is made for a third track to be provided on the storage tape in addition to the aforesaid two tracks, as will be seen from FIGURES 7 and 8. The addition of a third track on the storage tape has a two-fold purpose. In the first instance, the construction and mode of operation of the arrangement according to FIGURE 7 will be described. The storage tape 30a illustrated there has the three tracks 96, 97 and 98 and is obviously provided with a perforation (not shown) in the same manner as the two-track tape according to FIGURE 6. The track 96 corresponds exactly to the track 93 of the two-track tape according to FIGURE 6 and contains the already previously recorded alternating-current voltage of constant amplitude, which is sensed by a sound head 41a. As already described hereinbefore in connection with the two-track tape, the alternating-current voltage picked up by the sound head 41a is amplified and recorded by a further sound head 40 on the sound track 98 which to that extent corresponds to the sound track 94 of the tape shown in FIGURE 6. On this track are the further sound heads 38, 39 and 42. The amplification of the alternating-current voltage picked up by the sound head 41a is effected by way of a per se known amplifier 99; from there the amplified alternating-current voltage is fed to the already mentioned modulation amplifier and is modulated in this in accordance with the thickness deviations picked up by the thickness measuring device 23. The modulated alternating-current voltage then passes through the line 45 in the manner already described, to the sound head 40. The alternating-voltage picked up from the sound head 41a is not only fed to the amplifier 99 and thence to the modulation amplifier 50, but also to an amplifier 100 and thence to a sound head 95 which is situated exactly beside the sound head 41a on the middle sound track 97. According to the invention, the previously recorded sound track 96 is now no longer used as in the case of the tape according to FIGURE 6, but only the "daughter-track" 97 derived therefrom. The advantage of this is that the amplifier 100 can be so constructed that in respect to its frequency response it corresponds to the two amplifiers 99 and 50 together. In consequence, on a comparison between the sound tracks 98 and 97, all those amplitude variations due to a frequency response of the said amplifiers are eliminated and only the required modulation corresponding to the thickness deviation is left.

Figure 8:
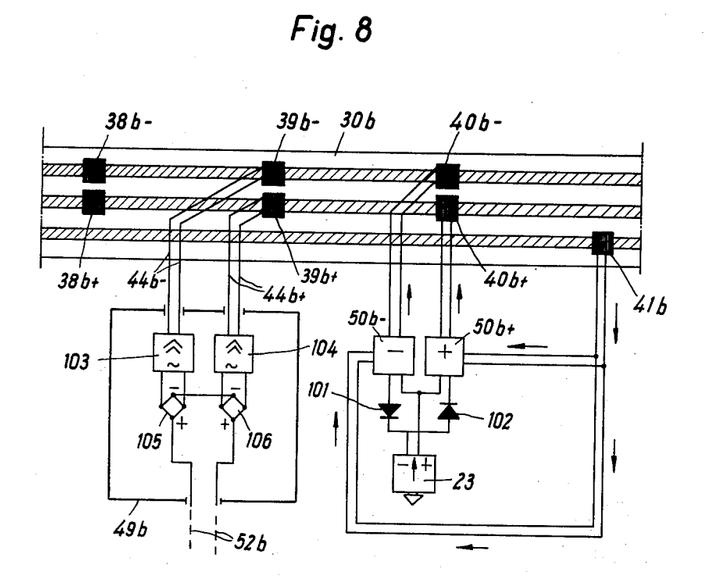
FIG. 8 is a diagrammatic view of a part of the circuit shown in FIG. 1, modified for a three-track storage tape.

This comparison may be effected, for example, by means of an arrangement of the kind described hereinafter with reference to FIGURE 8, employing double sound heads 38, 39, 40 and a two-channel amplifier 49, use being made in some circumstances of amplifiers which have an automatic level equaliser.

Hereinbefore it has been assumed that all possible thickness deviations, from the maximum expected negative value to the maximum possible expected positive value, are recorded on a single sound track in the form of an amplitude modulation, the thickness deviation of zero having a medium modulation, for example 50%, associated with it and all the negative thickness deviations being accommodated in the region from 50 to zero percent, while all the positive thickness deviations are accommodated in the region from 50 to 100% modulation. However, if it is desired to have a larger range available for recording the thickness deviations, it is possible to use as shown in FIGURE 8 a three-track tape, in which one track serves, as before, for the prior recording of a normal alternating-current voltage, while the other two tracks are used for the recording of thickness deviations, namely one track for the recording of the positive and the other track for the recording of the negative thickness deviations. As will be seen from FIGURE 8, the tape 30 has a lower sound track containing the pre-recorded alternating-current voltage and sensed by the sound head 41b. The middle track serves for the recording of the positive thickness deviations and is provided with the sound heads 38b+, 39b+ and 40b+, while the upper track serves for the recording of the negative thickness deviations and is provided with the sound heads 38b−, 39b− and 40b−. Instead of the former single heads 38, 39 and 40 in the arrangements shown in FIGURES 6 and 7, use is therefore made of double heads here, which separately pick up the positive and negative deviations and pass them to separate amplifiers or the like.

The alternating-current voltage picked up by the sound head 41b is fed to two modulation amplifiers 50b— and 50b+ which may be constructed in the same manner as the modulation amplifier 50 explained with reference to FIGURE 1. The direct-current voltages of positive or negative polarity supplied by the thickness measuring device 23 and proportional to the thickness deviations from the required value are separated from one another by an electrical system comprising the rectifiers 101 and 102, the positive direct-current voltage pulses being fed always only to the modulation amplifier 50b+, and the negative only to the modulation amplifier 50b—. Accordingly, one of the two sound heads 40b— and 40b+ is supplied with a correspondingly modulated alternating-current voltage, while the other is supplied at the same time with an unmodulated alternating-current voltage. Since always at any one time only either a negative or a positive thickness deviation may occur, only one of the two tracks can contain a modulated alternating-current voltage. The other track, which at that time contains precisely an unmodulated alternating-current voltage, is then used as a "daughter standard" in the same way as the sound track 97 in the arrangement according to FIGURE 7.

In accordance with the two-track recording by means of the sound heads 40b— and 40b+, the picking-up must also be effected through two channels in the first instance. Thus, for example, the two sound heads 39b— and 39b+ are connected by the lines 44b— and 44b+ to the two alternating-current voltage amplifiers 103 and 104, the output alternating-current voltages of which are rectified by two separate rectifiers 105 and 106. Bridge rectifiers in a Graetz circuit are preferably used here. The output sides of these two rectifiers are connected in series in opposition so that a direct-current voltage is discharged through the line 52b and passed to the follower device 20 (see FIGURE 1), which voltage corresponds to the difference between the two modulations. In this way all undesirable modulations which, for example, are produced by the frequency response of the amplifiers, are eliminated in similar manner to the arrangement according to FIGURE 7.

It should also be pointed out that the apparatus according to the invention can be used with advantage in reversing rolling mills as well. In this case the entire apparatus containing the storage tape and the associated sound heads, amplifiers and the like must be doubled. In that case, therefore, for one strip to be rolled two storage tapes are provided, which are coupled to said strip synchronously and of which in each case one is connected for recording while the other carries out the regulation and correction of the rolling machine. In this case, of course, at the end of the working section of each strip another special sound head is provided which in manner known per se serves to erase the recordings which are no longer required (not shown).

What is claimed for this invention is:

1. A control device for a strip rolling mill having a roll-stand with a roll-gap adjusting means therefor and strip feeding means whereby the strip is fed from a supply reel to the roll-stand and is re-coiled after passing the roll-stand, comprising a storage tape having thereon a record representing the variations of thickness of the strip being fed to the roll-stand; tape feeding means for feeding the storage tape at a speed which is an unvarying function of the angular velocity of said supply reel, said tape feeding means comprising a first pick-up head for scanning said storage tape to sense the variations of thickness of the strip being fed to the roll-stand, said pick-up head being connected to a switching device, said switching device being connected to said strip feeding means for varying the angular velocity of said supply reel, drive means for said storage tape, and means connecting said drive means to said strip feeding means.

2. A control device as defined in claim 1 including a thickness gauge located behind the roll-gap for sensing the thickness of the strip, a second pick-up head for scanning the storage tape to sense the variations of thickness of the strip being fed to the roll-stand, and a follower device connected to both the thickness gauge and the second pick-up head for controlling said roll-gap adjusting means and therewith the size of the roll-gap.

3. A control device as defined in claim 1 including a thickness gauge located behind the roll-gap for sensing the thickness of the strip after passage through the roll-gap, a third pick-up head for scanning said storage tape to sense the variations of thickness of the strip being fed to the roll stand, said thickness gauge and said third pick-up head being connected to a correcting device, said correcting device including means for comparing the thickness of the strip as sensed by the thickness gauge with the thickness of the strip as sensed by the third pick-up head, a follower device connected to said roll-gap adjusting means for varying the roll-gap, said correcting device being connected to said follower device to control the size of the roll-gap.

References Cited in the file of this patent

UNITED STATES PATENTS

| | | |
|---|---|---|
| Re. 25,075 | Hessenberg | Oct. 31, 1961 |
| 2,051,018 | Umansky | Aug. 11, 1936 |
| 2,441,648 | Senard | May 18, 1948 |
| 2,479,974 | Sendzimir et al. | Aug. 23, 1949 |
| 2,843,446 | Pettus et al. | July 15, 1958 |
| 2,883,895 | Vossberg | Apr. 28, 1959 |
| 2,960,568 | Leyton | Nov. 15, 1960 |
| 2,977,422 | Pear | Mar. 28, 1961 |

FOREIGN PATENTS

| | | |
|---|---|---|
| 1,114,501 | France | Dec. 19, 1955 |